Nov. 23, 1926.

G. F. MYERS 1,608,109

VEHICLE

Original Filed August 23, 1909    2 Sheets-Sheet 1

Inventor:
George Francis Myers.

Nov. 23, 1926. 1,608,109
G. F. MYERS
VEHICLE
Original Filed August 23, 1909  2 Sheets-Sheet 2
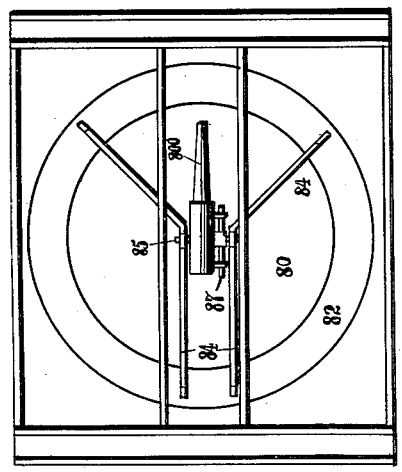
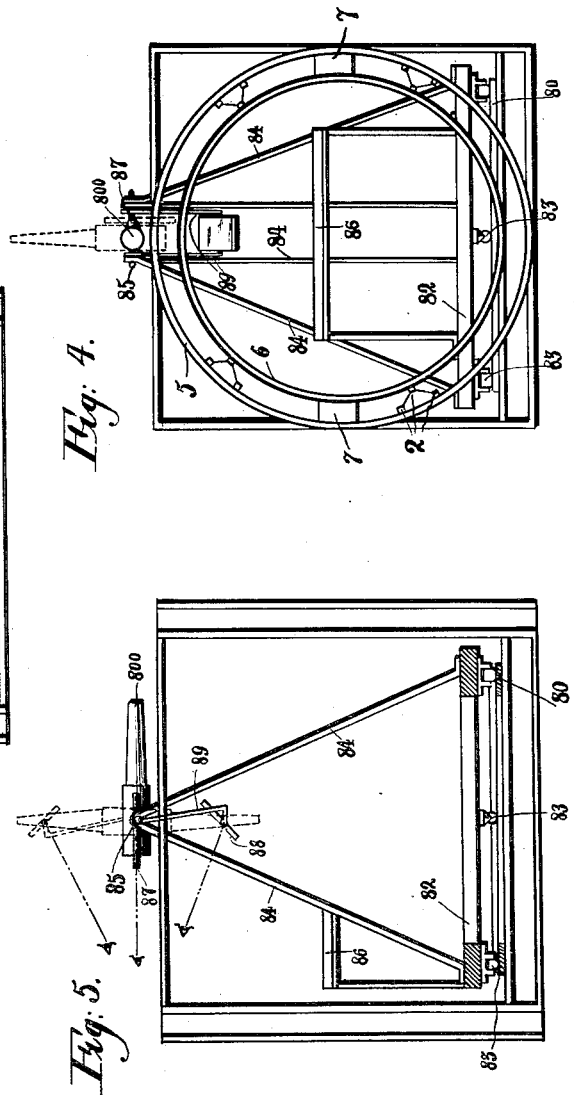
Inventor:
George Francis Myers Patented Nov. 23, 1926.

1,608,109

UNITED STATES PATENT OFFICE.

GEORGE FRANCIS MYERS, OF NEW YORK, N. Y.

VEHICLE.

Original application filed August 23, 1909, Serial No. 514,165. Divided and this application filed December 1, 1916, Serial No. 134,550. Renewed December 12, 1924.

This invention relates to vehicles, and particularly to that class thereof that are used in warfare.

The object of the invention is to transport heavy bodies through the air especially guns, cannon or other instruments of destruction.

It consists of a gun or cannon or other instrument of destruction that can be turned in any direction on the vehicle.

It further consists in improved means for supporting and operating the gun or cannon or other instrument of destruction. It also consists in certain novel features, which will now be described and then particularly pointed out in the claims.

This application is a division of my application dated August 23, 1909, and serially numbered 514,165.

In the accompanying drawings:

Fig. 3 is a top plan view, on an enlarged scale of the gun or cannon bearing part, or projectile compartment, of the vehicle.

Fig. 4 is an end view of the same.

Fig. 5 is a side elevation, partly in section.

Similar characters of reference indicate corresponding parts throughout the several views.

Figure 1:
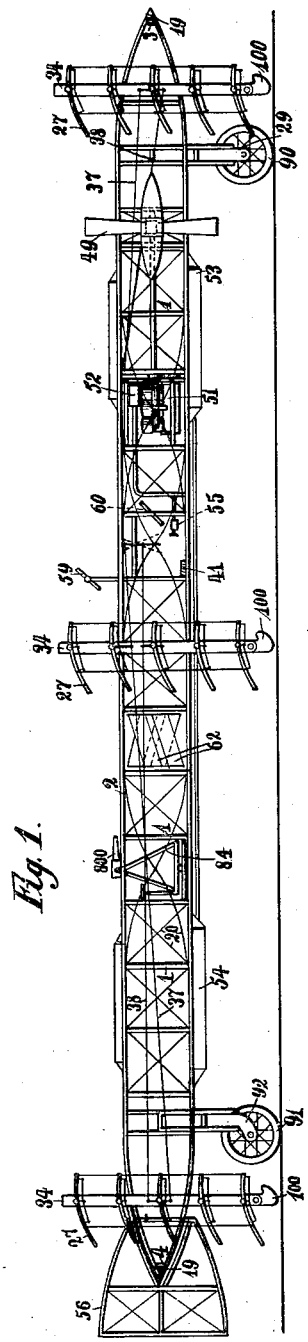
Figure 1 is a side elevation of a vehicle embodying my invention equipped for warfare.

The vehicle is constructed and operated substantially and preferably as follows, it being understood that the same may be used as an aeronautical vehicle, or as a vehicle adapted to travel at speed over the surface of the earth in which case the aeroplanes take off more or less of the weight of the machine from the earth engaging means.

The invention consists of or includes or comprises—which is to say that besides other things the vehicle or aerial war machine has—a main frame having the general form of a hollow or tubular horizontal cylindrical body which is provided with conical front and rear ends and comprises a plurality of transverse circular girders 1 arranged axially in line, a plurality of longitudinal girders 2 connecting the several circular girders at different parts of their peripheries, and front and rear heads 3, 4 with which the front and rear ends, respectively, of the longitudinal girders are connected. Each of the circular girders consists of an outer circular bar, ring or hoop 5, an inner circular bar, hoop or ring 6 arranged concentrically within the outer ring and in the same transverse plane, and spacing pieces, blocks or struts 7 arranged between the inner and outer rings and connected therewith by bolts, screws, rivets or other suitable means.

Figure 2:
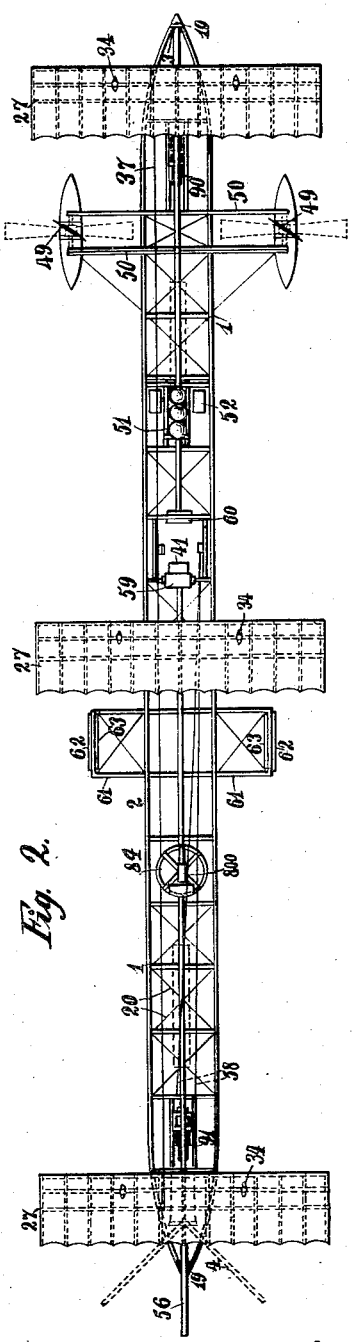
Fig. 2 is a top plan view thereof.

In order to complete a conical formation at each end of the frame a conical nose or nose piece 19 of sheet metal or other suitable material is secured with its base to the outerside of the flat head of the frame, as shown in Figures 1 and 2.

For the purpose of stiffening the girders of the frame, tension members, ties, guys or wires 20 are provided which extend diagonally or obliquely relatively to different parts of the frame in all available directions and which are secured at suitable points to the frame work so as to rigidly connect different members of the frame and securely unite them.

If desired, a skin or covering may be applied to the outerside of the frame to protect the parts within the frame, which covering may be transparent either wholly or in parts. The vehicle is mounted on wheels 90, 91; and may have skids 100 if desired.

Near the front or rear ends and the center of the frame or body of car or fuselage the same carries front, rear end central sets of planes 27 operated by the cords 37, 38, whereby the machine is raised in the air when designed to travel principally through the said medium.

The said cords turn the said planes 27 of the front, middle and rear sets of planes on their axes one independently of the other. Other cords curve the different sets of planes from flat to curve planes. Some of the said planes extend over the car, some below the same, and some are constructed in sections and extend on either side of the car.

49 represents a pair of propellers which move the machine forwardly and which are mounted on brackets 50 projecting laterally from opposite sides of the machine in rear of the foremost set of planes. The motor 51 for driving the propellers is arranged within the main frame between the operator's compartment and the propellers and may be operatively connected with the latter in any suitable manner. This motor is of the internal combustion or hydrocarbon type and its gasolene supply or liquid fuel tanks 52 are arranged above the same within the frame. Suspended from the underside of the main frame near opposite ends thereof are two gasolene storage tanks or reservoirs 53, 54 from which the gasolene may be withdrawn as required and delivered to the supply tanks 52 by means of a pump 55 in the operator's compartment. By this means the weight of the main supply of gasolene is distributed over the length of the main frame and prevents unbalancing the machine.

56 is the upright rudder for steering the machine which is pivoted vertically to the rear part of the main frame and bifurcated, so that it can straddle the conical rear end of the frame or body, as shown in Figure 1. One of the important problems to be solved, in aerial navigation, is that of the stability of the aerodyne, both as regards its longitudinal axis and transversely; i. e. to keep it from pitching and rolling. The stabilizers or ailerons 62, 63, will rotate or roll or point the gun or other instrument of destruction 800; and its charge and projectile or the like, around the longitudinal axis of the vehicle; the elevator or elevators 27, either fore or aft or together, will depress or pitch or point the said gun or the like around the transverse axis of the vehicle; and the rudder 56 will twist or turn or point the said gun or the like around the vertical axis of the vehicle. Or the same controls will prevent the pitching and rolling or turning of the said gun or the like on the said principal axes of the vehicle in case it be desired to do so. In order to turn the vehicle on its longitudinal axis the stabilizing means 62 and 63 are employed. The stabilizers may be operated manually or automatically.

For the purpose of enabling the operator while seated in his compartment to observe the space ahead of the machine without necessitating turning his head toward either side of the machine two pivotable periscopes 59, 60 may be employed.

For use in warfare the vehicle is provided with a cannon or other instrument of destruction 800 which is arranged above the body or frame in rear of the stabilizer.

80 represents a platform or circular track arranged horizontally in the turret or gunner's compartment in the frame or body and surrounding an opening of substantially the same diameter in the cover of the body. The gunner's compartment or turret is made square in cross section, as shown in Figure 4, by extending the sides of the body for this purpose or otherwise. Within the gunner's compartment and projecting upwardly through an opening in the top of this compartment is a horizontally rotatable carriage 82 which has an unobstructed interior and which comprises a lower circular base or ring provided with wheels 83 running on the track 80 and a pair of standards or oblique members 84 which project upwardly from opposite sides of the base through the top opening of the gunner's compartment and to the upper ends of which above the main frame or body the cannon is pivoted by means of horizontal trunnions 85. By turning the carriage horizontally in the frame and the cannon vertically on the carriage it is possible for the gunner to aim the cannon in all directions within a hemisphere above the frame or body of the machine and even downwardly through the body both bottom and sides into different parts of a conical field or zone of fire if desired, thereby commanding practically the entire space around the flying machine and affording the maximum capacity for attack or defense.

The projectile, bullet, bomb, or other instrument of destruction used in the said cannon or other like instrument in the said attack or defense may be discharged therefrom in any convenient manner.

The carriage is provided with a seat 86 for the gunner whereby the latter is supported by the carriage and remains in a definite location relative to the cannon as the carriage is rotated.

When the cannon is aimed horizontally above the frame, or nearly so, as shown by full lines in Fig. 5 the gunner is aided by looking directly into and forwardly through a telescope 87 secured lengthwise to one side of the cannon. If, however, the cannon is pointed upward or downward the gunner is enabled to look conveniently through the telescope by means of a mirror or periscope 88 which is pivotally supported on arms or links 89 which turn concentrically with the fulcrum of the cannon on the cannon bridge.

When the cannon is pointed upwardly the periscope is arranged at an angle below the same, so as to enable the gunner to sight the cannon through the telescope in this position of the cannon while upon pointing the cannon downwardly the periscope for this purpose is adjusted into an angular position above the cannon.

The gunner's opening or turret or compartment or cockpit or section as shown is longitudinally disposed to the aero sustaining or lifting or supporting means as well as the operator's or pilot's opening or cockpit or the like and of different cross section if desired; the latter being of curved or circular cross section, and the former of angular or square cross section.

The trunnions 85 are mounted adjacent to a vertical line passing substantially through the center of the said platform or circular track and project above the upper surface of the frame or body or fuselage, the gunner when seated on the seat 86 being partly in and partly out of or above the said opening or cockpit. The said platform, the said carriage, the said trunnions and the said gun when in its vertical position are encompassed by the vertically projected outer wall or sides of the cockpit. The cariage when travelling over the said circular track is so arranged that the gunner when seated on the said seat 86 is partly inside the said carriage 82 and uprights or standards 84, and moves himself and the said carriage whenever he turns the said gun to fire in a different direction. The gun when fired in a perpendicular direction to the longitudinal center line of the machine, especially if this be in the downward direction, is partly within or below the top portion of the body.

The pilot's section contains the operating means for controlling and guiding the machine leaving the gunner free to manipulate the gun. The gunner's position or seat 86 is, as can be readily seen, in the rear of and above the middle or lower planes of the front set of sustaining devices 27, and also in the rear of and above the pilot's position or seat 41, the motor 51 and the hubs of the propellers 49; and both the pilot's seat, and that of the gunner, are mounted between the leading edges of the front set of planes and the trailing edges of the rear set of planes. And the middle or central set of planes is between the said two positions or seats.

It will also be noted that the second plane from the top lies in contact with the top portion of the fuselage; and that the fourth plane from the top lies in contact with the bottom portion of the same; and that both extend across and on each side thereof.

As my invention is in some of its aspects generic, I do not limit myself to the particular construction and operation shown or described, but also contemplate the employment of such equivalents as fairly fall within the scope of my claims.

In this connection I may state that I do not limit myself to the gun being in the shape of a cannon, as any other shape or kind of an instrument of destruction may be employed. The gun may have its mounting adjacent to the upper or uppermost portion of the machine or the fuselage or the carrying portion thereof, as shown in a companion application to said 514,165, namely, one filed July 17, 1909 and serially numbered 508,208, where I show a gun and its universal mounting wholly above the top of the body or carrying place and adapted to fire unobstructedly in the upward direction unhindered by the sustaining, directing and controlling means of the machine; and the said gun was also adapted to fire in the downward direction.

The lifting, supporting or sustaining means, or aeroplanes may be rectangular in shape as shown, or the same may be annular, as shown in my application filed May 31, 1904 and serially numbered 210,486, now Patent 995,550; or of any other shape or kind. Or the said sustaining means may be helicopters as in a companion application to the said 210,486, namely one filed January 29, 1897 and serially numbered 621,233; or they may be of the ornithopter type as shown in another companion application filed June 30, 1905, and serially numbered 267,804.

Instead of mounting the stabilizing means on longitudinal axes as shown herein, I may mount them on transverse axes and operate them either as shown in said 267,804, or as shown in an application filed December 5, 1908 and serially numbered 466,080, that is either manually and separately, or automatically; or I may mount them on vertical axes and operate them as shown in another companion application filed July 9, 1909 and serially numbered 506,817, that is with a joy stick or the like; or I may use revolving planes or helicopter propellers for stabilizing means as shown in still another companion application filed September 20, 1905 and serially numbered 279,281, part of which became Patent 1,226,985; or I may use flapping wings as shown in said 267,804; or I may use any combination of the above mentioned stabilizing means and their modes of operation.

Therefore it should be understood that I may make various changes in the form, proportion, size and detail of the several structures shown, the number and position of certain elements used, as well as the character of the motive power employed, without departing from the spirit of my invention.

I claim:

1. In a flying machine of the heavier than air type, the combination of a body elongated in form and extending in the direction of travel, an aeroplane supporting surface transversely disposed with reference to the main body and projecting laterally therebeyond, said main body having a cockpit longitudinally removed from said transverse aeroplane, a platform carried by said main body and disposed within said cockpit, a gun carriage adjustable in a horizontal plane about said platform, a gun mounted on said carriage which is capable of adjustment in the vertical planes for firing in the upward direction, means for propelling and directing the movements of said aircraft and the gun, whereby the craft may be driven to the point desired and the gun may be fired unobstructedly in the upward direction unhindered by the sustaining, propelling and controlling means of the craft.

2. In a flying machine of the heavier than air type, the combination of a body elongated in form and extending in the direction of travel, an aeroplane supporting surface transversely disposed with reference to the main body and projecting laterally therebeyond, said main body having a cockpit at a point longitudinally removed from said transverse aeroplane, a platform carried by said body and disposed within the cockpit, a carriage mounted on said platform which is capable of adjustments in the horizontal plane, a gun borne by said carriage at a point elevated substantially on a level with the upper part of said main body, said gun being capable of adjustments in the vertical planes for fire in upward directions, means for propelling and directing the movements of said craft, whereby the craft may be propelled and directed to the point desired and the gun may be fired unobstructedly in the upper direction unhindered by the sustaining, propelling and controlling means.

3. In a flying machine of the heavier than air type, the combination of a body elongated in form and extending in the direction of travel, an aeroplane supporting surface transversely disposed with reference to the main body and projecting laterally therebeyond, said aeroplane being disposed slightly above the level of the main body upper surface and said main body having a cockpit at a point longitudinally removed from said transverse aeroplane, said cockpit being large enough to accommodate the mounting of a gun and an operator, a circular runway carried by said main body and disposed about the cockpit, a gun carriage mounted on the circular ring and capable of adjustments in the horizontal plane, a gun borne by said carriage at a point elevated substantially on a level with the upper part of said main body, said gun being capable of adjustments in the vertical planes for fire in upward directions, means for propelling and directing the movements of said craft, whereby the craft may be propelled and directed to the point desired and the gun may be fired unobstructedly in the upper direction unhindered by the sustaining propelling and controlling means.

4. In a flying machine of the heavier than air type, the combination of a body elongated in form and extending in the direction of travel, an aeroplane supporting surface transversely disposed with reference to the main body and projecting laterally therebeyond, said main body having a cockpit longitudinally removed from said transverse aeroplane, a circular platform carried by said main body within the cockpit and disposed below the level of the upper surface of the main body, a gun carriage adjustable in a horizontal plane about said platform and adapted to carry a gun support slightly above the level of the upper surface of the main body, a gun mounted on said support which is capable of adjustment in the vertical planes for firing in the upward direction, means for propelling and directing the movements of said aircraft and the gun, whereby the craft may be driven to the point desired and the gun may be fired unobstructedly in the upward direction unhindered by the sustaining propelling and controlling means of the craft.

5. In a flying machine of the heavier than air type, the combination of a body elongated in form and extending in the direction of travel, an aeroplane supporting surface transversely disposed with reference to the main body and projecting laterally therebeyond, said main body having a cockpit longitudinally removed from said transverse aeroplane, a circular ring carried by said main body within the cockpit and disposed near the bottom thereof, a gun carriage adjustable in a horizontal plane about said circular ring and having standards projecting upwardly through the cockpit to a point substantially on a level with the upper surface of the main body, a gun mounted on said standards which is capable of adjustment in the vertical planes for firing in upward directions, means for propelling and directing the movements of said aircraft and the gun, whereby the craft may be driven to the point desired and the gun may be fired unobstructedly in the upward direction unhindered by the sustaining propelling and controlling means of the craft.

6. In a flying machine of the heavier than air type, the combination of a body elongated in form and extending in the direction of travel, an aeroplane supporting surface transversely disposed with reference to the main body and projecting laterally therebeyond, said main body having a cockpit longitudinally removed from said transverse aeroplane, a circular runway carried by said main body and disposed about said cockpit, a gun carriage mounted on said runway and adjustable in a horizontal plane thereabout, a gun mounted on said carriage which is capable of adjustment in the vertical planes for firing in upward and downward directions, and means for propelling and directing the movements of said aircraft and the gun, whereby the craft may be driven to the point desired and the gun may be fired unobstructedly in the upward directions and within the zone of the cockpit in the downward directions unhindered by the sustaining, propelling and controlling means of the craft.

7. In combination with an aeroplane having an open bottom gun compartment in the body thereof, a gun carriage, a gun and gun bearings therefor upon said carriage and adapted to be shifted so that the gun can be trained above and directly below said aeroplane and also horizontally in substantially any direction.

8. In combination with an aeroplane having an open bottom gun compartment in the body thereof, a gun carriage and longitudinally disposed from the aerofoil of the aeroplane, a gun, and gun bearings therefor upon said carriage adapted to be shifted so that said gun can be trained above or directly below said aeroplane and also horizontally in substantially any direction.

9. In combination with an aeroplane having an open bottom gun compartment in the body thereof, a gun carriage and longitudinally disposed from the aerofoils of said aeroplane and in longitudinal alignment therewith, a gun, and gun bearings therefor upon said carriage adapted to be shifted so that said gun can be sighted upon an object above or directly below said aeroplane or laterally thereof.

10. In a flying machine of the heavier than air type, the combination of an inclosed body elongated in form and extending in the direction of travel, a sustaining device transversely disposed with relation to the said body and projecting therebeyond, said body having an opening therein or cockpit, a platform or circular track carried by the said body and disposed about the said opening, a gun carriage adjustable in a horizontal plane about the said platform, trunnion means mounted on the said carriage, a gun mounted on the said trunnion means which is capable of adjustment in the vertical direction, the said platform, carriage, trunnion means and the said gun when in its position for firing in the vertical direction being encompassed by the projection of the outer wall or sides of the said cockpit, and means for propelling and directing the movements of the machine and the said gun whereby the machine may be driven to the point desired and the gun fired unobstructedly in the upward direction unhindered by the sustaining, propelling and controlling means of the machine.

11. In a flying machine of the heavier than air type, the combination of an enclosed body elongated in form and extending in the direction of travel, a sustaining device transversely disposed with relation to the said body and projecting therebeyond, said body having an opening or cockpit therein, a platform or circular track carried by the said body and disposed about the said opening, a gun carriage adjustable in a horizontal plane about the said platform, trunnion means projecting from the said carriage, a gun mounted on the said trunnion means and which is capable of adjustment in the vertical direction, and when trained upwardly perpendicularly to the longitudinal center line of the said body is so mounted as to project below the top of the same, and means for propelling and directing the movements of the machine and the said gun whereby the machine may be driven to the point desired and the gun fired unobstructedly in the upward direction unhindered by the sustaining, propelling and controlling means of the machine.

12. In a flying machine of the heavier than air type, the combination of an enclosed body elongated in form and extending in the direction of travel, a sustaining device transversely disposed with relation to the said body and projecting therebeyond, said body having an opening or cockpit therein, a platform or circular track carried by the said body and disposed about the said opening, a gun carriage adjustable in the horizontal plane about the said platform, trunnion means mounted on the said carriage and movable therewith, a gun mounted on the said trunnion means and which is capable of adjustment in the vertical direction and when fired perpendicularly is enclosed in part within the said cockpit, and means for propelling and directing the movements of the machine and the said gun whereby the machine may be driven to the point desired and the gun fired unobstructedly in the upward direction unhindered by the sustaining, propelling and controlling means of the machine.

13. A flying machine of the heavier than air type, the combination of an enclosed body elongated in form and extending in the direction of travel, a sustaining device transversely disposed with relation to the said body and projecting therebeyond, said body having an opening or cockpit therein, a platform or circular track carried by the said body and disposed about the said opening, a gun carriage adjustable in a horizontal plane about the said platform, trunnion means on the said carriage and movable therewith, a gun mounted on the said trunnion means and which is capable of adjustment in the vertical direction, a sighting device for aiming the said gun when in its vertical positions without sighting along the center line of the same, and means for propelling and directing the movements of the machine and the said gun whereby the machine may be driven to the point desired and the gun fired unobstructedly in the upward direction unhindered by the sustaining, propelling and controlling means of the machine.

14. In combination with an aeroplane provided with a gun compartment having an opening in the bottom thereof, a gun carriage, and a gun movable on the said carriage and adapted to be shifted so that the same can be trained directly above the aeroplane, and directly below the aeroplane through the said opening.

15. In combination with an aeroplane provided with a gun compartment having an opening in the top thereof, and an opening in the bottom thereof, a gun carriage, and a gun movable on the said carriage and adapted to be shifted so that the same can be trained directly above the aeroplane through the upper opening, and can be trained directly below the said aeroplane through the lower opening.

GEORGE FRANCIS MYERS.